United States Patent [19]

Simmons

[11] Patent Number: 4,465,017
[45] Date of Patent: Aug. 14, 1984

[54] SEED COATING MACHINE

[76] Inventor: John J. Simmons, 220 Avenue B W., Bismarck, N. Dak. 58501

[21] Appl. No.: 473,817

[22] Filed: Mar. 9, 1983

[51] Int. Cl.³ .................. B05C 1/02; B05C 3/08; B05C 5/02; B05D 1/42
[52] U.S. Cl. .................. 118/418; 118/19; 118/20; 118/64; 118/304; 118/308; 118/684; 427/214; 427/242
[58] Field of Search .......... 118/303, 19, 417, 418, 118/300, 676, 684, 700, 701, 702, 704, 313; 47/57.6, DIG. 9; 427/214, 242, 212; 209/284, 288, 293; 239/25, 38, 145; 222/478, 479; 401/16, 35, 25; 366/15, 91, 25

[56] References Cited

U.S. PATENT DOCUMENTS

| | | | |
|---|---|---|---|
| 1,423,014 | 7/1922 | Peruzzi | 118/19 |
| 1,655,753 | 3/1926 | Cole | 209/284 |
| 2,123,988 | 7/1938 | Corley | 239/145 |
| 2,543,898 | 6/1946 | De Vaney | 209/288 |
| 2,897,826 | 1/1958 | Di Vito | 401/28 |
| 3,911,860 | 10/1975 | Nohynek | 118/303 |

Primary Examiner—Michael R. Lusignan
Assistant Examiner—Robert J. Steinberger, Jr.
Attorney, Agent, or Firm—Schroeder, Siegfried, Vidas & Arrett

[57] ABSTRACT

A seed coating machine comprising an upper mixing drum wherein a liquid adhesive coating is applied to seed and where the rate of application is regulated by a valve controlled by the seed feeder. Coated seed is dried to a state of tackiness and passed to a second, lower mixing drum. A variety of powders are applied onto the tacky seed after being mixed and sifted in a screen distributor. The resulting coated seed has an outer powder layer which adheres to the inner adhesive coating.

7 Claims, 2 Drawing Figures

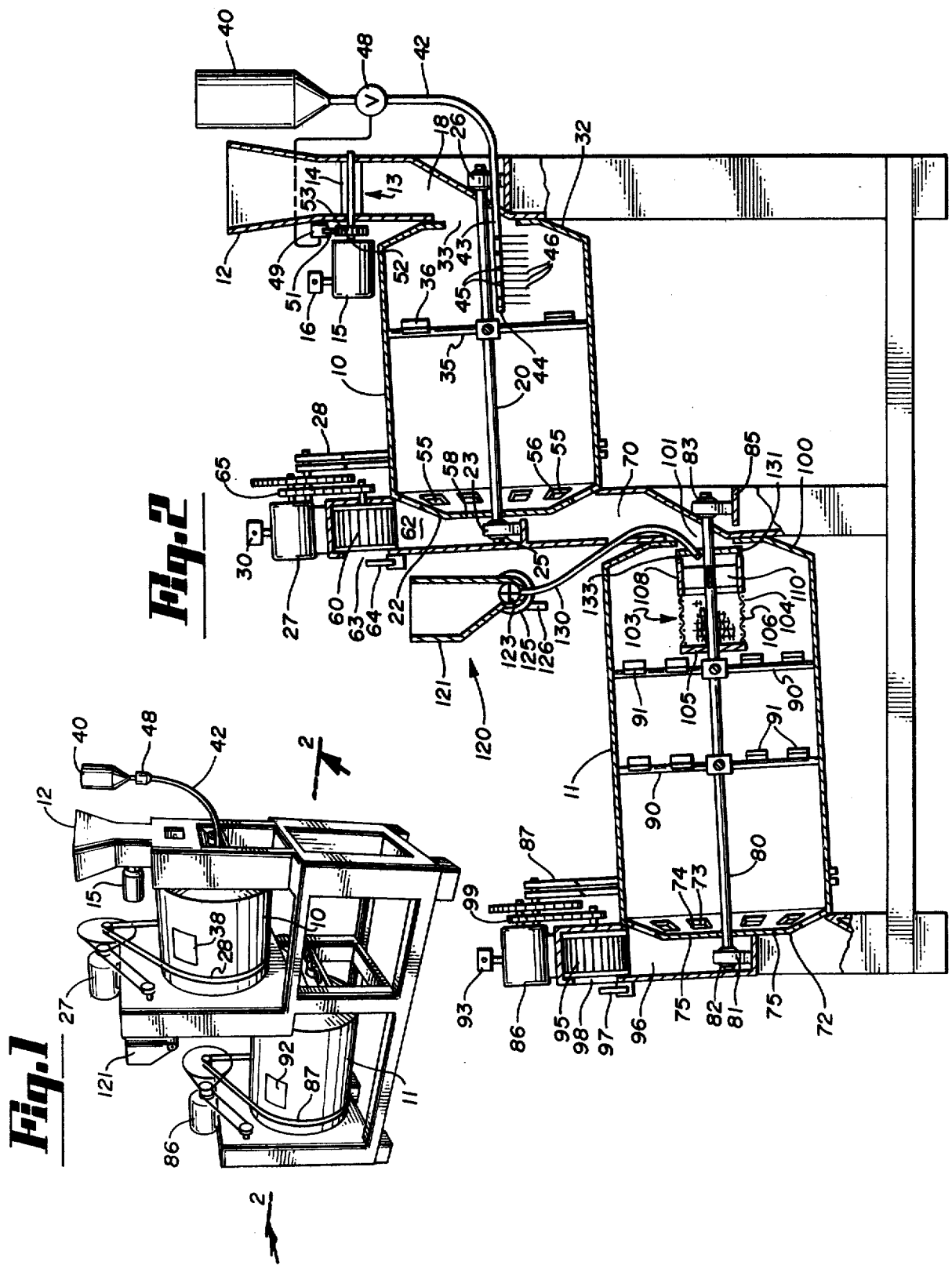

4,465,017

SEED COATING MACHINE

DESCRIPTION

FIELD OF THE INVENTION

This invention relates to a machine for providing a uniform coating of water absorbent powder, microorganisms and nutrients to seed.

BACKGROUND OF THE INVENTION

Light, moisture and nutrients are factors which determine the yield of seed crops. Water absorbing chemicals have been used as coatings on seeds or broadcast onto and into the soil. Water absorbent chemicals attract moisture to the seed to provide earlier germination, more uniform stands and increased yields.

In particular, starch graft polymer compositions absorb and retain under pressure large quantities of fluids. In U.S. Pat. Nos. 3,997,484, 3,935,099 and 3,985,616 to Weaver et al, starch graft polymers are described which have the ability to absorb very large amounts of water equalling up to more than 1,000 times their own weight.

Many variations of starch graft copolymers are available on the market and have been applied as coatings on substrates, such as seeds, to increase the water holding capacity of the substrate.

Seeds have been coated with herbicides, fungicides or super absorbents, such as the family of super water absorbents sold under the trademarks SORBEX 200 and SGP (for Starch Graft Polymers) by the Henkel Corporation. Seeds have been coated by feeding the powder onto seeds rotating in a cement mixer. Liquids have also been sprayed onto seeds to provide a coating of a desirable chemical.

All plants require a variety of nutrients and trace elements or micronutrients. It is known that many bacteria may form a beneficial association with plants. Bacteria of the genus Rhizobium infect the roots of legume plants, such as clover, alfalfa and beans. The roots respond to these infections by producing lump-like growths or nodules in which the bacteria grow. The bacteria incorporate free nitrogen, some of which is made available to the host plant.

While the addition of bacteria to seeds has been recognized as beneficial to increasing crop yields, bacteria die quickly in dry soils. Bacteria, if applied to seeds, must be maintained in a dormant state until planted and must be activated only when conditions favor optimum growth.

BRIEF SUMMARY OF THE INVENTION

Seeds are coated with a first material, such as the latex-water composition sold by Rohm and Haas Company under the mark Rhoplex designation B-15, as an aqueous dispersion. The moisture content of the latex coating is then adjusted until the seeds are tacky.

The tacky surfaced seeds are then coated with a dry superabsorbent chemical powder, such as SORBEX ®, which is a water insoluble alkali salt of saponified, gelatinized starch polyacronitrile graft polymer. The superabsorbent is added as a powder which adheres strongly to the tacky latex coating of the seed.

Various types of fungicides, insecticides, nutrients, micronutrients and beneficial bacteria may in accordance with the invention be mixed with the SORBEX superabsorbent powder prior to its being coated onto the tacky seed. Generally, the chemical coating referred to herein, with the exception of the adhesive, may be referred to as Plant Growth Factor Powders.

Coated seeds stored in apparently dry condition remain stable and the bacteria remain dormant. Once planted, the seeds draw on free soil moisture and soil vapor. The water and superabsorbent forms a thin layer of water laden gel around the seed. This moisture is passed onto the seed, and, as the seed takes moisture from the gel, more moisture is absorbed from the soil. The water gel formed by the superabsorbent coating softens the moisture barriers of outer seed tissue. The continued absorption of water by the superabsorbent causes both the coating and the seed to swell, exerting pressure in all directions against the soil. This build-up of pressure improves the seed to soil contact which is important to steady movement of moisture from the soil to the seed. The seeds are thereby provided with a more constant water supply.

In addition to the ability to absorb large quantities of free moisture, the superabsorbent coating also absorbs water vapor as the relative humidity reaches a level between about 90 to 100 percent. The ability to draw moisture from the air means that a coated seed placed in a semi-dry seedbed will begin to attract moisture vapor immediately from the soil. Even a relatively dry seedbed has very high humidity in the air spaces just beneath the surface of the soil. This humidity increases during the night when above ground air becomes cooler, and deep soil moisture moves towards the surface through capillary movement and as a vapor. The attraction of moisture to the coated seeds provides a head start to seed germination.

A superabsorbent coating improves the chance that seedlings will escape entrapment in crust caused by rain showers that occur after planting. The coating encourages rapid root growth to deeper soil moisture, which is especially important when the top two or three inches of surface are dry and already in moisture stress. The coating shortens the time of exposure to seedling pathogens and helps to avert poor stands on hilltops and other portions of a field in moisture stress.

Treating seeds with "beneficial" bacteria allows these bacterium to get a head start over natural, undesirable bacteria that impede plant growth. The superabsorbent absorbs free water which begins the germination process and provides a suitable environment for the bacteria. The bacteria then multiply and follow the root system down into the soil. Some bacteria produce antibiotics that inhibit the growth of toxigenic microorganisms, thereby providing a built-in protection from the date of seeding. The applied bacteria or beneficial fungus may also play a critical role in the uptake of nutrients and water by the plants. It is known that uptake of phosphorus, as well as several other minerals, are enhanced by bacterial infections. Nutrients, such as zinc, sulfur, nitrogen, copper, iron and calcium are all taken up more efficiently from soil root systems having higher amounts of microorganism than by those with a lower amount.

The addition of nutrients, micronutrients, herbicides, and/or insecticides also promotes higher crop yields when coated to seeds. Broadcasting fertilizers, herbicides and the like over planted seeds necessarily results in some waste due to the large amounts of chemicals which must be applied. The use of direct coatings of nutrients and other chemicals to the seed provides a readily available source for the seeds exactly where it is needed. As a consequence, fewer pounds of the relatively expensive superabsorbent, fertilizers and other chemicals need to be used per acre of planted crops. A greater percentage of the seeds germinate and germinate more quickly which allows earlier harvesting.

BRIEF DESCRIPTION OF THE DRAWINGS

The detailed description of the invention, including its preferred embodiment, is hereinafter described with specific reference being made to the drawings in which:

FIG. 1 is a perspective view of the seed coating machine of the invention; and

FIG. 2 is a cross-sectional view of the seed coating machine through lines 2—2 of FIG. 1.

DETAILED DESCRIPTION OF THE INVENTION

SEED COATINGS

Many seeds can benefit from the application of the coatings of the invention; however, in order to supply a sufficient quantity of chemicals to the seed, a first "adhesive" layer has been found to be necessary.

Adhesive

The adhesive must be capable of transmitting moisture therethrough so that moisture can reach the seed coating. The adhesive must be capable of forming a tacky surface to the seed such that a powder will adhere well.

The selection of adhesive is based on the ability of the adhesive to air dry to an essentially water-free tacky state. This is necessary to prevent the later added water-absorbing polymers from forming a water-absorbing reaction. If water-absorbing polymer is added to wet seeds, it does not adhere when the absorbent swells.

It has been found that various latexes, guar gums and caseins provide suitable adhesives. The preferred adhesive is an aqueous dispersion of acrylic copolymers sold under the trademark Rhoplex as sold by Rohm and Haas Company of Philadelphia, Pennsylvania. This form of latex has approximately 46 to 50 percent solids and is generally compatible with bacteria.

Absorbent

Soil productivity in arid regions is dependent on water stored in the soil. Crops, such as corn and soybeans, use water at a rate as much as two inches or five centimeters per week. In five of the corn belt states, the average rainfall in July and August is two and one-half inches less than corn requires.

A variety of superabsorbent powders are available which absorb many times their weight in water. In U.S. Pat. Nos. 3,985,616, 3,997,484 and 3,935,099 to Weaver et al, a superabsorbent compound is described which can absorb approximately 800 to 1,000 times its weight in water. The absorbent material acts like a sponge absorbing, releasing and reabsorbing water over and over. The compounds are generally starch containing graft copolymers. Specifically, the Weaver et al superabsorbents are water insoluble alkali salts of saponified, gelatinized-starch polyacrylonitrile graft polymers containing gelatinized starch (GS) and saponified polyacrylonitrile (HPAN). The polymers are cross linked so as not to be water soluble.

A number of modifications of the superabsorbents described in the Weaver et al patents have been developed. Water absorbent powders marketed under the SORBEX trademark and designations 200 and SC400 have been found to be suitable. The absorbency of the powders can be varied by adding materials, such as the starch under the trademark GENVIS 200 as sold by the Henkel Corporation. A variety of inert drying agents, such as Bentonite clays, diatomaceous earths, talc or similar materials may be added to dilute the amount of moisture found in the absorbent powders so as not to trigger or initiate premature activity.

Water absorbent powders do not adhere well to bare seeds. Hence, it has been found that the addition of an adhesive to the seed as described above is necessary. It is generally not economical to mix a superabsorbent into the entire soil. However, it has been found that, when sandy soil is treated with 0.2% by weight superabsorbent, the treated soil has about the same water holding capacity as the best soil in the corn belt states.

Generally, superabsorbents must be those which do not liquefy if the humidity is below about 80%. The addition of approximately 0.60 pounds of superabsorbent per 100 pounds of seed provides approximately four times the amount of superabsorbent material available to the seed as compared to the case where superabsorbent is broadcast onto the ground.

Micro-organisms

It is well known that some plants such as legumes which include soybeans and alfalfa, have nitrogen fixing bacteria as a necessary component in a symbiotic relationship. The root nodule bacteria Rhizobium bathes the root hairs of the plant and fixes nitrogen in the nodules that are formed. These Plant Growth Promoting Rhizobacteria (PGPR) are necessary in legumes. They are thought to be beneficial for other plants as well.

Molds actively decompose cellulose, plant and animal proteins and other complex organic substances. The carbon and nitrogen of these substances become available to other microbial life and eventually plants. Beneficial fungi include *Aspergillus niger* and Basidiomycetes which form mycorrhiza. Mycorrhiza aid in the absorption of salts and other materials from soil to the plant. The immediate viscinity of plant roots—the rhizosphere—is a region of great microbial activity and hence normally contains a large number of organisms. Plant roots excrete amino acids, simple sugars and nucleic acid derivatives which are used as nutrients by bacteria. Some bacteria in turn produce plant stimulants known as auxins. It has also been found that a flourishing rhizosphere microbial population provides a "buffer zone" in which many plant pathogens are suppressed, in part by antibiotics formed by the normal population.

High populations of PGPR coating seeds inhibit colonization of roots by Rhizoctonia, Verticillium, Pythium and other classical plant pathogens. The greatest benefit of the seed treatment of the invention may be inhibition of slightly parasitic or nonparasitic but toxigenic bacteria.

Microorganisms such as PGPR's do not become established on root systems when the soil is allowed to dry below 1.7 bars. The coating of seeds with superabsorbents and microorganisms provides favorable ecological conditions that favor their growth and survival. The coating further serves as a source of food for some of the microorganisms.

Microorganisms, including Pseudomonas, Arthrobacter, Nocardia, Rhizobacter, *Aspergillus niger*, Bacillus, mixed anaerobic and mixed facultative organisms prepared in a freeze-dried or otherwise dormant state, may be beneficially added as a powder to the tacky seed. Commerically available blends of beneficial bacteria and fungi are available which typically include from about 5 to 20% freeze-dried microorganisms and 80 to 95% inert fillers. The addition of microorganisms to the seed, when coupled with the absorbents detailed above, provides an environment which maintains the dormancy of the bacteria due to the low moisture content until planting. Upon planting, coated seed, due its absorbent materials, absorbs and releases water for use by the bacteria and fungi which triggers life into the dormant microorganisms as well as sustains their life. In a dry soil, enough water is normally available to trigger life, but without the use of the superabsorbents, many of the microorganisms would die. Effective nodulation occurs only when species of Rhizobium of the proper beneficial bacteria are present, and these are not likely to be abundant in the soil upon which plants of another group have been raised for several years. Therefore, for each seed type which is to be planted, microorganisms may be carefully selected as is known in the art and added in powder form to the tacky seed directly with the superabsorbent. Direct inoculation of the seed with bacteria places the bacteria in the most advantageous position for beneficial infection.

The importance of the root nodule bacteria can be appreciated more easily when it is realized that the amount of nitrogen fixed by the symbiotic relationship is contained in 500 to 1000 pounds of commercial fertilizer containing 10% nitrogen per acre. The addition of plant growth promoting bacteria and fungi allows their establishment in dry soils due to their combination with the superabsorbent.

Seeds

Potentially, seed coatings of the invention may be beneficial to any seed variety. Some of the seeds which benefit by the coating are soybean, corn, wheat, sorghum, sunflower, cotton, alfalfa, clover, barley, rye, mylo, rape, triticale and vegetable seeds. Generally, all legumes and plants within the Grass order Graminales may benefit from the invention.

Nutrients

Nutrients are generally the major elements plants need to maintain growth. Besides carbon, hydrogen and oxygen which are obtained through water and the air, major nutrients include calcium, nitrogen, potassium, phosphorus, magnesium, sulfur and iron. A powder containing nutrients may be mixed with the superabsorbent material and applied to the tacky coated seed to provide an initial enriched environment for the seed. Commercial preparations of nutrients may be used. A suitable mix by weight percent would be nitrogen 41.55, potassium 27.70, calcium 13.85, magnesium 5.54, phosphorus 5.54, sulfur 2.77 and iron 0.277.

Micronutrients

Micronutrients, or minor elements, are not less essential to plants, but are required in much smaller amounts. Micronutrients include chlorine, magnesium, boron, zinc, copper, molybdenum and others, depending on the plant involved. Some micronutrients are indirectly essential for the plant growth. Cobalt, for example, is essential for the bacteria in the nitrogen fixing nodules of legumes. Chromium and nickel also appear to be essential in trace amounts.

Micronutrients may be added as a powder to the tacky seed in conjunction with the superabsorbent bacteria and nutrients. Micronutrient selection is based on the seed involved and the requirements for that seed. Both nutrients and micronutrients may be added in larger amounts to soil which have been depleted in specific elements. Thus, the seed coatings can be tailor-made to the environment in which they will be used.

Chelator

It has been found that the addition of a chelating agent to the superabsorbent or directly to the adhesive greatly benefits germination and the initial growth period of seeds. Prior broadcast methods are very expensive and are short-lived due to deactivation of the chelates in soil.

Chelates bound tightly to the seed within the gel formed by the superabsorbent enable the seed to utilize micronutrient metals. Chelating agents may include edetates, EDTA-salts, citrates, lignin sulfonate and the chelating agent sold under the mark SEQUESTRENE 138 by Ciba-Geigy.

The addition of about three-tenths of a pound of the SEQUESTRENE 138 chelator to one hundred pounds of tacky soybean seeds with iron as a micronutrient greatly improves the uptake of iron by the seeds. The metals are soluble in a bound relationship. Plain broadcasting is about four times less efficient than the direct coating method of the invention.

SEED COATING MACHINE

The seed coating machine shown in FIGS. 1 and 2 consists generally of an upper revolving drum 10 and a lower revolving drum 11 which move the seed during the coating operations. The seed enters upper hopper 12 which includes star feeder 13. Star feeder 13 includes a plurality of blades 14 which are rotated by a DC electric motor 15, controlled by a rheostat switch 16.

The seed then drops by gravity into chute 18 which enters upper revolving drum 10.

Upper revolving drum 10 revolves about its longitudinal axis on shaft 20. Upper drum 10 is tilted approximately ten degrees from the horizontal, such that the drum end 32 is higher, causing any seed within drum 10 to move to the other end of the drum due to gravity. Shaft 20 passes through drum end 22 through bulk head journal 23. Drum 10 is supported generally by a frame, as shown in FIG. 2. Shaft 20 is supported by bearings 25 and 26 on each end. The drum is driven by an electric motor 27 and belt 28. Motor 27 is controlled by switch 30, which includes a rheostat or other suitable method of controlling speed.

Drum end 32 includes opening 33 through which shaft 20 passes. Opening 33 extends to about one-third of the diameter of drum end 32 from the central shaft 20. Chute 18 projects slightly into opening 33 with shaft 20 passing through a wall of chute 18. Drum 10 is supported on shaft 20 in part by one or more cross-shaped supports 35 which are attached to the outer perimeter of drum 10 and to the shaft 20. Supports 35 include paddles 36 which are attached thereto and are angled slightly to move the seed toward drum end 22 to lift the seed.

Drum 10 includes an inspection window and port 38 through which samples may be taken and visual inspections can be made. Liquid adhesive is supplied to drum 10 from container 40 and is gravity-fed through tubing 42. Tubing 42 passes through chute 18 and metal pipe 43 which is attached to chute 18 and extends into drum 10. Metal pipe 43 has an end cap 44 and its length is formed with perforations 45 through which adhesive can flow.

A series of solid tines or wires 46 are attached to the metal pipe 43 hanging downward into drum 10 like tines on a comb, such that liquid flowing through perforations 45 flows along tines 46 causing liquid to drop down onto seeds in drum 10.

The tines 46 extend downward such that seed entering drum 10 from chute 18 passes underneath, through and around the tines 46 and tumbles due to the rotation of drum 10. Tines 46 are preferably about six to eight inches long and spaced ⅜ to one inch apart. Tines 46 may be formed of wire approximately three millimeters in diameter. Valve 48 operates to control the addition of adhesive from container 40 through tubing 42. Valve 48 is preferably a gravity type valve controlled by microswitch 49. Actuator wheel 51 is attached to star feeder 13 by shaft 52 and plate 53. As each station of star feeder 13 and blades 14 move, actuator wheel 51 trips microswitch 49 opening valve 48. Thus, for each station of seeds dumped from feed hopper 12, and additional aliquot of adhesive is applied to metal pipe 43 and tines 46 to drip onto the seed.

Alternatively, valve 48 may be controlled by an independent motor and control switch. In this manner, the feed of seeds may remain constant while the adhesive supply rate is altered. In any event, valve 48 is preferably manually adjustable to vary the flow rate of adhesive independent of star feeder 13. An adjustable orifice would be satisfactory. Actuator wheel 51 may also be provided with trip tabs (not shown) which may be threaded into actuator wheel 51. The number of trip tabs engaging the microswitch may be varied, thereby adjusting the adhesive rate by screwing or unscrewing the trip tabs.

Drum end 22 discharges seed through a plurality of slots 55 arranged radially as shown about drum end 22. Each slot 55 preferably includes a manually controlled sliding valve 56 which may be varied to control the rate of seeds exiting the drum 10. Drum end 22 also preferably includes openings 58 about shaft 20, thereby forming a seed overflow outlet.

Air blower 60 circulates air through drum 10 from plenum 62 which is adjacent drum end 22 as shown. Air blower 60 includes inlet 63 which preferably includes slide control 64 manually varying air volume through drum 10. Blower 60 may be a squirrel cage type blower and may be powered by motor 27 through belt 65.

Adhesive coated seed passes through slot 55 of drum 10 through ducting 70 and enters lower revolving drum 11, which is constructed in a manner similar to upper revolving drum 10. Lower revolving drum 11 includes a discharge drum end 72 formed with slots 73, sliding valve 74 and opening 75 as in drum 10. Shaft 80 passing through lower drum 11 includes bulk head journal 81, bearings 82 and 83 supported on frame 85. Motor 86 rotates lower revolving drum 11 by belt drive 87. Lower drum 11 includes T-shaped supports 90, paddles 91 and inspectional window and port 92, which are constructed as detailed above for upper revolving drum 10. Motor 86 is controlled by variable speed control switch 93.

Lower revolving drum 11 also includes an air blower system which is preferably separate from the upper air blower 60. Lower air blower 95 directs air through plenum 96 to discharge drum end 72 and is controlled by adjusting slide 97 on inlet 98. Lower air blower 95 may be powered by motor 86 and belt 99.

Inlet drum end 100 includes central opening 101 through which seed enters drum 11 from ducting 70. Shaft 80 includes a mixer distributor 103 which comprises a cylinder 104 about shaft 80. Plate 105 closes off the lower end of cylinder 104. Cylinder 104 comprises a screen 106 of approximately forty to two hundred mesh material adjacent to plate 105. Preferably, screen 106 is formed of about sixty to 95 mesh material. Near the inlet drum end 100 and cylinder 104 is a solid entry section 108. Mixer distributor 103 rotates whenever lower drum 11 rotates. Mixer distributor 103 includes lifters or paddles 110 which are designed and angled such that powder placed in solid entry 108 is lifted, mixed and pushed into screen 106. Powder materials are supplied to mixer distributor 103 from a powder feeder 120. Powder feeder 120 includes hopper 121.

Hoppers 121 feed powder through star valve 123 which are controlled by variable speed motor 125 and switch 126. Powder feeder 120 may be powder feeders sold by the Gandy Company of Owatonna, Minnesota, under designation Gandy Row applicators, as Super, Junior, Jumbo and Regular.

Powder exits powder feeder 120 through plastic tubing 130 which passes through fixed plate 131 and extends slightly into mixer distributor 103. Fixed plate 131 is separated from mixer distributor 103 by gap 133. Plastic tubing 130 must be grounded to avoid the static charge that develops from powder flowing therewithin.

A plurality of powder feeders 120 may be utilized, each with a different chemical. Alternatively, the premix of desired powders may be supplied from a single feeder 120.

Generally, all surfaces within the upper drum 10 and lower drum 11 are lined with a polyethylene coating to prevent adherence of tacky seeds to the mixing apparatus. A one eighth inch thick sheet of polyethylene overlaying the drum interior chutes, paddles and shafts has proven to be satisfactory.

OPERATION

Seeds are placed in seed hopper 12. Switch 16 is adjusted to control the speed of star feeder 13. Seed passes through chute 18 into upper revolving drum 10 whose speed 13 is adjusted by switch 30.

Seeds vigorously tumble in upper drum 10 and are lifted by tines 46. Each turn of star feeder 13 causes actuator wheel 51 to trip microswitch 49 and open adhesive supply valve 48. Adhesive flows to metal pipe 43 and down tines 46. Seed is coated with adhesive by passing near and around tines 46.

The adhesive coated seeds are checked through inspection port 38. Air blower 60 is adjusted to supply drying air to dry the adhesive until the seeds are tacky enough to pick up dry powder and not clump to each other. Adhesive valve 48 and star feeder 13 may also be adjusted to achieve tackiness.

Paddles 36 and the incline of upper drum 10 cause the coated, tacky seed to pass through slots 56, ducting 70 and into lower drum 11. Drum 11 is also inclined at about ten degrees from the horizontal to aid the flow of seeds to discharge drum end 72. Lower drum 11 is preferably longer than upper drum 10 to provide greater seed retention time for powder placement.

Powder feeder 120 supplies superabsorbent, nutrients, microorganisms, micronutrients, herbicides, fungicides, insecticides and bactericides in any combination and relative percentage desired. Several powder feeders 120 may be utilized. Also, all seed coating additives, except dry mix microorganisms, may be admixed with liquid adhesive in container 40.

Powder enters mixer distributor 103 where individual powders are mixed in solid entry section 108 due to its rotating movement and inclined lifters 110. Mixed powder enters screen 106 and is dusted as a fog onto the tumbling, tacky seeds within lower drum 11. Screen 106 functions in a manner similar to flour sifters. Coarser powders tend to pick up free moisture decreasing adherence of powder to the coated, tacky seeds.

Individual motor 125 controlling powder feeders 120 are adjusted to provide enough powder to completely cover the tacky seeds. Inspection port 92 may be utilized to determine if enough powder is being supplied.

The seed, now coated with a dry powder and no longer tacky, passes out of lower drum 11 into a packaging system.

What is claimed is:

1. An apparatus for coating seeds comprising:
    (a) first mixing means for mixing seeds including seed dispensing means;
    (b) means for supplying liquid adhesive to seed within said first mixing means, said adhesive supply means including a perforated hollow pipe having a plurality of tines depending therefrom, and being constructed and arranged such that liquid adhesive flows over and around said tines;
    (c) means for drying said liquid adhesive coating said seeds within said first mixing means;
    (d) second mixing means for receiving and mixing liquid adhesive coated seeds from said first mixing means;
    (e) means for supplying one or more substantially dry powders to said second mixing means; and
    (f) means for receiving, mixing and sifting said substantially dry powders onto said liquid adhesive coated seeds.

2. The apparatus of claim 1 wherein said seed dispensing means includes means for regulating said liquid adhesive supply means comprising an actuator wheel attached to said seed dispensing means, said actuator wheel actuating a microswitch which controls said liquid adhesive supply means.

3. The apparatus of claim 1 wherein said means for receiving, mixing and sifting said substantially dry powders onto said liquid adhesive coated seeds comprises a mixer distributor, said mixer distributor including a rotating cylinder formed with a first entry portion, intermediate powder mixing portion and an exit screen portion.

4. The apparatus of claim 3 wherein said intermediate powder mixing portion of said mixer distributor includes a plurality of lifter blades inclined to mix said substantially dry powders therewithin and carry said mixed powders to said exit screen portion.

5. The apparatus of claim 4 wherein said exit screen portion of said mixer distributor is constructed of metal in the range of 40 to 200 mesh.

6. An apparatus for coating seeds comprising:
    (a) a first mixing assembly including a chamber having an exit and an inlet,
    (b) means for introducing adhesive including a liquid carrier into said chamber, said adhesive introducing means including a perforated hollow pipe having a plurality of tines depending therefrom and being constructed and arranged such that liquid adhesive flows over and around said tines;
    (c) means for churning seeds within said chamber such that said seeds become coated with said adhesive by contacting said tines;
    (d) means for drying at lest a portion of the liquid component of said adhesive coating said seeds;
    (e) a second mixing assembly including a second chamber, said second chamber including an exit and an inlet;
    (f) means for introducing adhesive coated seeds from said first mixing assembly into said second mixing assembly chamber;
    (g) means for supplying one or more powders to said second mixing assembly; and
    (h) means for receiving, mixing and sifting said powders onto said adhesive coated seeds within said second mixing assembly.

7. The apparatus of claim 6 wherein said means for receiving, mixing and sifting powders onto adhesive coated seeds includes a rotating cylinder into which powder is supplied, said rotating cylinder including a first entry portion, an intermediate powder mixing portion including a plurality of lifter blades inclinded to mix said powders therewithin and to carry said mixed powders to an exit screen portion having openings through which said mixed powders may pass.

* * * * *